(12) United States Patent
Koike et al.

(10) Patent No.: US 6,277,938 B1
(45) Date of Patent: Aug. 21, 2001

(54) PROCESS FOR THE PREPARATION OF NON-BIREFRINGENT OPTICAL RESIN AND OPTICAL ELEMENTS MADE BY USING THE RESIN PREPARED BY THE PROCESS

(75) Inventors: Yasuhiro Koike, Yokohama; Akihiro Yoshida, Ichihara; Hiromasa Kawai, Ichihara; Minoru Suzuki, Ichihara, all of (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/230,155
(22) PCT Filed: Jul. 29, 1997
(86) PCT No.: PCT/JP97/02634
§ 371 Date: Aug. 3, 1999
§ 102(e) Date: Aug. 3, 1999
(87) PCT Pub. No.: WO98/04601
PCT Pub. Date: Feb. 5, 1998

(30) Foreign Application Priority Data

Jul. 30, 1999 (JP) .................................................. 8-199901

(51) Int. Cl.⁷ .......................... C08K 5/103; C08K 5/124; C08L 33/08; C09K 15/08
(52) U.S. Cl. .......................... 526/258; 526/263; 526/310; 526/319; 526/328.5
(58) Field of Search .................................... 526/258, 263, 526/310, 311, 319, 328.5

(56) References Cited

U.S. PATENT DOCUMENTS 4,888,401 * 12/1989 Kawaki et al. ...................... 525/468

FOREIGN PATENT DOCUMENTS

| 63248812A | * 10/1988 | (JP) . |
| 01215810 | * 8/1989 | (JP) . |
| 01308413A | * 12/1989 | (JP) . |
| 9169883-A | * 9/1997 | (JP) . |

* cited by examiner

Primary Examiner—David W. Wu
Assistant Examiner—Tanya Zalukaeva
(74) Attorney, Agent, or Firm—Fish & Richardson, P.C.

(57) ABSTRACT

A process for the preparation of a non-birefringent optical resin, characterized by copolymerizing a monomer mixture consisting of the following monomers (A) to (E) at such a ratio as to give the resin having an absolute value of orientational birefringence of less than $1 \times 10^{-6}$; wherein (A): 5 to 40 wt % of a methacrylic or acrylic ester having a $C_5$–$C_{22}$ aliphatic hydrocarbon group in the ester moiety;
(B): 50 to 80 wt % of methyl methacrylate;
(C): 5 to 40 wt % of an N-substituted maleimide;
(D): 0 to 30 wt % of benzyl methacrylate;
(E): 0 to 10 wt % of a monomer copolymerizable with these monomers, and optical elements made by using the resin prepared by this process.

6 Claims, 2 Drawing Sheets

PROCESS FOR THE PREPARATION OF NON-BIREFRINGENT OPTICAL RESIN AND OPTICAL ELEMENTS MADE BY USING THE RESIN PREPARED BY THE PROCESS

BACKGROUND OF THE INVENTION

1. Technical Field

The present invention relates to a process for the preparation of a non-birefringent optical resin suitable for various kinds of optical elements and a optical element made by using the resin prepared by the process.

2. Background Art

For optical elements, such as lenses, prisms, optical disks, LCD (liquid crystal display) substrates and the like, glass has been used hitherto. In recent years, however, a polymeric resin has become to be used in order to make products lighter and more compact. As a polymeric resin used for the optical elements, polystyrene, polycarbonate, polymethyl methacrylate, styrene-methyl methacrylate copolymer and the like are commonly known. However, since polystyrene, polycarbonate and the like have aromatic rings in the molecule, they easily have a birefringence owing to their orientational distortion. Thus, it is necessary to manage to modify a mold as shown in Japanese Published Unexamined Patent Application JP61-14617 A. Therefore, polymethyl methacrylate has been mainly used as the material for the optical elements.

Since polymethyl methacrylate has a small photoelastic coefficient and relatively hardly has a birefringence owing to its orientational distortion, it has been used for optical elements having a relatively low accuracy, such as lenses for finders, pickup lenses for CDs and the like.

In recent years, however, optical elements having higher accuracy has been required. Especially, optical elements, such as laser pickup lenses for write once optical disks and magnetic optical disks, write once optical disks, magnetic optical disks and the like, are required to have not only a small birefringence but also a very small birefringence in the vicinity of the gate.

As a device birefringence of its material comes into question, a liquid crystal device can be cited. As commonly known, a liquid crystal device can rotate the polarization plane of the light in a liquid crystal layer between a polarizer and an analyzer, which are positioned as the crossed Nicole position or the parallel Nicole position, and whereby the liquid crystal device can control the light transmittance. Therefore, with regard to the liquid crystal device, a birefringence of each element makes a big problem and whereby prevents the optical resin from being widely used for the liquid crystal device.

For example, although a birefringence of the methyl methacrylate can be reduced to a certain value by modifying a molding condition, a birefringence in the vicinity of the gate can not be zero. Thus, the methyl methacrylate can not be used for such a optical device of high-accuracy as the liquid crystal display.

Therefore, in order to reduce the birefringence, the following five methods are proposed. (1) Copolymerizing a monomer for a resin having a positive photoelastic coefficient and a monomer for a resin having a negative photoelastic coefficient as the essential raw materials, so that the obtained copolymer has a small absolute photoelastic coefficient equal to or less than $1\times10^{-13}$ $cm^2$/dyne, that is from $-1\times10^{-13}$ $cm^2$/dyne to $+1\times10^{-13}$ $cm^2$/dyne. (JP60-185236 A) (2) Copolymerizing methyl methacrylate, an alkyl methacrylate having an alkyl group with 3 to 8 carbons and a styrene. (JP60-250010 A and JP60-76509 A) (3) Copolymerizing methyl methacrylate, tricyclo tricyclo[$5.2.1.0^{2.6}$] deca-8-yl methacrylate and styrene. (JP62-246914 A) (4) Copolymerizing a monomer that can yield a homopolymer having a positive birefringence (trifluoroethyl methacrylate, benzyl methacrylate and the like) and a monomer that can yield a homopolymer having a negative birefringence (methyl methacrylate and the like). (JP2-129211 A) (5) Copolymerizing methyl methacrylate for a resin having a certain photoelastic coefficient and a compound having an unsaturated double bond for a second resin having a photoelastic coefficient whose sign is opposite to that of the first resin. (JP4-76013 A)

Although these conventional methods can obtain the acceptable results, they still have many insufficiencies. For example, the methods of (1), (2), (3) and (5) may not remove a birefringence completely in case of injection molding. Namely, a birefringence owing to stress distortion remains in the vicinity of the gate and the produced resin has an insufficiency as a non-birefringent material.

With regard to the method of (4), although combinations of monomer mixture are disclosed, among them a method of using a monomer mixture of methyl methacrylate (MMA) and trifluoro methacrylate (3FMA) have a problem that the latter (3FMA) is very expensive.

Also, in case of the method of copolymerizing a monomer mixture of methyl methacrylate (MMA) and trifluoroethyl methacrylate (3FMA) or the method of copolymerizing a monomer mixture of methyl methacrylate (MMA) and benzyl methacrylate (BZMA), it is necessary to large the rate of 3FMA/MMA or BZMA/MMA considerably in order to prevent an orientational birefringence being generated. Namely, in case of 3FMA, 50 wt % or more is necessary and in case of BZMA, 20 wt % or more is necessary. Therefore, the methods have a problem that the resin is inferior to PMMA resin in respect of their thermostability (heatstability) and transparency.

The present invention has been achieved to solve the forgoing problems. Thus, the objectives of the present invention are to provide a process for the preparation of a non-birefringent, thermostable and low moisture absorbent optical resin and to provide a non-birefringent, thermostable and low moisture absorbent optical elements made by the resin prepared by the process.

DISCLOSURE OF THE INVENTION

In order to achieve the objectives, the present invention has the following gist.

[1] A process for the preparation of a non-birefringent optical resin, characterized by copolymerizing a mixture consisting of the following monomer ingredients (A), (B), (C), (D) and (E) at such a ratio as to give the resin having an absolute value of orientational birefringence of less than $1\times10^{-6}$.

(A): 5 to 40 wt % of a methacrylic or acrylic ester having a $C_5$–$C_{22}$ aliphatic hydrocarbon group in the ester moiety.
(B): 50 to 80 wt % of methyl methacrylate.
(C): 5 to 40 wt % of an N-substituted maleimide.
(D): 0 to 30 wt % of benzyl methacrylate.
(E): 0 to 10 wt % of a monomer copolymerizable with these monomers.

[2] The process for the preparation of a non-birefringent optical resin as recited in the above [1], wherein said "(A): a methacrylic ester or an acrylic ester having a $C_5$–$C_{22}$ aliphatic hydrocarbon group in the ester moiety" is selected from the group consisting of cyclohexyl methacrylate, isobornyl methacrylate, norbornyl methacrylate, norbornylmethyl methacrylate, tricyclo[5.2.1.0$^{2.6}$]deca-8-yl methacrylate and tricyclo[5.2.1.0$^{2.6}$]deca-4-methyl methacrylate.

[3] The process for the preparation of a non-birefringent optical resin as recited in the above [1], wherein said "(C):" an N-substituted maleimide is selected from the group consisting of N-methyl maleimide, N-ethyl maleimide, N-propyl maleimide, N-isopropyl maleimide, N-butyl maleimide, N-isobutyl maleimide, N-tert-butyl maleimide, N-cyclohexyl maleimide, N-lauryl maleimide and N-phenyl maleimide.

[4] An optical element made by using the resin prepared by the process as recited in any one of the above [1] to [3].

THE BEST MODE FOR CARRYING OUT THE INVENTION

Figure 1:
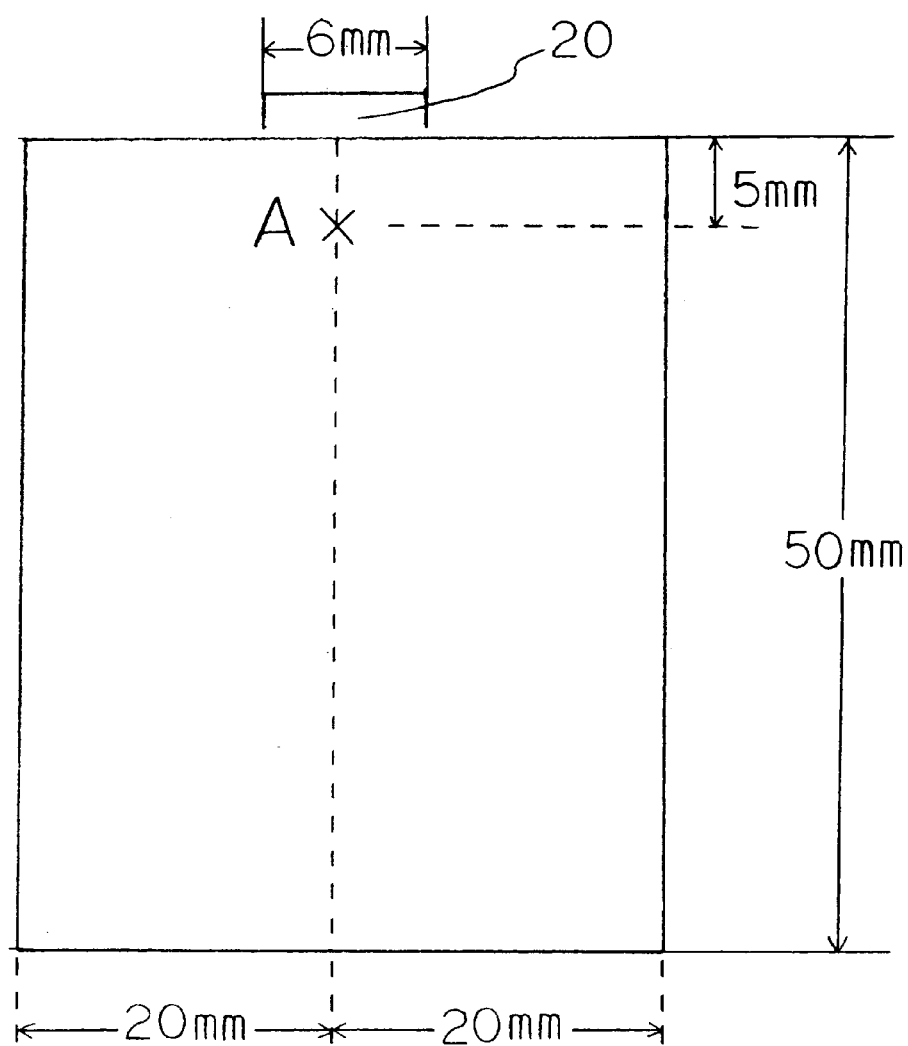
FIG. 1 shows the schematic front view of the test piece for the birefringent measuring of the molded article used in the embodiments of the present invention.

The best mode for carrying out the invention is exemplarily described in the following.

I. The Process for the Preparation of a Non-Birefringent Optical Resin

The process for the preparation of a non-birefringent optical resin according to the present invention is characterized by copolymerizing a monomer mixture consisting of monomers (A), (B), (C), (D) and (E) at such a ratio as to give the resin having an absolute value of orientational birefringence of less than $1 \times 10^{-6}$.

Each element is concretely described in the following.

1. Monomer Ingredient (A)

Monomer Ingredient (A) is a methacrylic or acrylic ester having a $C_5$–$C_{22}$ aliphatic hydrocarbon group in the ester moiety (aliphatic (meth)acrylic ester).

(1) Actual Examples of Monomer Ingredient (A)

With regard to the actual examples of Monomer Ingredient (A), as methacrylic or acrylic ester, for example, cyclopentyl acrylate, cyclohexyl acrylate, methylcyclohexyl acrylate, trimethylcyclohexyl acrylate, norbornyl acrylate, norbornylmethyl acrylate, cyanonorbornyl acrylate, isobornyl acrylate, bornyl acrylate, menthyl acrylate, phenthyl acrylate, adamantyl acrylate, dimethyladamantyl acrylate, tricyclo[5.2.1.0$^{2.6}$]deca-8-yl acrylate, tricyclo [5.2.1.0$^{2.6}$]deca-4-methyl acrylate, cyclodecyl acrylate, cyclopentyl methacrylate, cyclohexyl methacrylate, methylcyclohexyl methacrylate, trimethylcyclohexyl methacrylate, norbornyl methacrylate, norbornylmethyl methacrylate, cyanonorbornyl methacrylate, phenylnonorbornyl methacrylate, isobornyl methacrylate, bornyl methacrylate, menthyl methacrylate, phenthyl methacrylate, adamantyl methacrylate, dimethyladamantyl methacrylate, tricyclo [5.2.1.0$^{2.6}$]deca-8-yl methacrylate, tricyclo[5.2.1.0$^{2.6}$]deca-4-methyl methacrylate, cyclodecyl methacrylate and the like can be available. Among these compounds, in view of low moisture absorbency, cyclopentyl methacrylate, cyclohexyl methacrylate, methylcyclohexyl methacrylate, trimethylcyclohexyl methacrylate, norbornyl methacrylate, norbornylmethyl methacrylate, isobornyl methacrylate, bornyl methacrylate, menthyl methacrylate, phenthyl methacrylate, adamantyl methacrylate, dimethyladamantyl methacrylate, tricyclo[5.2.1.0$^{2.6}$]deca-8-yl methacrylate, tricyclo[5.2.1.0$^{2.6}$]deca-4-methyl methacrylate, cyclodecyl methacrylate and the like are preferred. Further, in view of thermostability and low moisture absorbency, the compound selected from the group consisting of cyclohexyl methacrylate, isobornyl methacrylate, norbornylmethyl methacrylate, tricyclo[5.2.1.0$^{2.6}$]deca-8-yl methacrylate and tricyclo[5.2.1.0$^{2.6}$]deca-4-methyl methacrylate, is especially preferred (2) The Ingredient Ratio With regard to Monomer Ingredient (A), methacrylic or acrylic ester having a $C_5$–$C_{22}$ aliphatic hydrocarbon group in the ester moiety, the ingredient ratio of "Monomer Ingredient (A) based on the sum total of the monomer mixtures ((A)+(B)+(C)+(D)+(E))" is preferably 5 to 40 wt %, and more preferably 10 to 40 wt % in view of absorbency. Where the ratio of the aliphatic (meth)acrylic ester is less than 5 wt %, its birefringence becomes large and its absorbency becomes large. Where the ratio of the aliphatic (meth)acrylic ester is more than 40 wt %, mechanical strength becomes low.

2. Monomer Ingredient (B)

Monomer Ingredient (B) used in the present invention is methyl methacrylate (MMA).

The ingredient ratio of "methyl methacrylate as Monomer Ingredient (B) based on the sum total of the monomer mixtures ((A)+(B)+(C)+(D)+(E))" is preferably 50 to 80 wt %, and more preferably 60 to 75 wt % in view of absorbency. Where the ratio of methyl methacrylate is less than 50 wt %, mechanical strength becomes low. Where the ratio of methyl methacrylate is more than 80 wt %, the problems regarding non-birefringence, thermostability and low absorbency occur.

2. Monomer Ingredient (C)

Monomer Ingredient (C) used in the present invention is an N-substituted maleimide.

Actual examples of an N-substituted maleimide as Monomer Ingredient (C), are N-methyl maleimide, N-ethyl maleimide, N-propyl maleimide, N-isopropyl maleimide, N-butyl maleimide, N-isobutyl maleimide, N-tert-butyl maleimide, N-lauryl maleimide, N-cyclohexyl maleimide, N-benzyl maleimide, N-phenyl maleimide, N-(2-chlorophenyl) maleimide, N-(4-chlorophenyl) maleimide, N-(4-bromophenyl) maleimide, N-(2-methylphenyl) maleimide, N-(2-ethylphenyl) maleimide, N-(2-methoxylphenyl) maleimide, N-(2,4,6-trimethylphenyl) maleimide, N-(4-benzylphenyl) maleimide, N-(2,4,6-tribromophenyl) maleimide and the like. In view of non-birefringence and thermostability, the compound selected from the group consisting of N-methyl maleimide, N-ethyl maleimide, N-propyl maleimide, N-isopropyl maleimide, N-butyl maleimide, N-isobutyl maleimide, N-tert-butyl maleimide, N-cyclohexyl maleimide, N-lauryl maleimide and N-phenyl maleimide is preferable.

(2) The Ingredient Ratio

The ingredient ratio of "the N-substituted maleimide as Monomer Ingredient (C) based on the sum total of the monomer mixtures ((A)+(B)+(C)+(D)+(E))" is preferably 5 to 40 wt %, and more preferably 15 to 30 wt % in view of birefringence. Where the ratio of the N-substituted maleimide is less than 5 wt %, birefringence becomes large. Where the ratio of the N-substituted maleimide is more than 40 wt %, reactivity becomes low and whereby lots of unreacted monomer molecules remain and birefringence becomes high.

4. Monomer Ingredient (D)

Monomer Ingredient (D) used in the present invention is benzyl methacrylate.

The ingredient ratio of "benzyl methacrylate as Monomer Ingredient (D) based on the sum total of the monomer mixtures ((A)+(B)+(C)+(D)+(E))" is preferably 0 to 30 wt %, and more preferably 4 to 20 wt % in view of thermostability and birefringence. Where the ratio of benzyl methacrylate is more than 30 wt %, glass transition temperature becomes too low.

5. Monomer Ingredient (E)

Monomer Ingredient (E) used in the present invention is a monomer copolymerizable with the Monomer Ingredients (A), (B), (C) and (D).

(1) Actual Examples of Monomer Ingredient (E)

As the Monomer Ingredient (E), a monomer whichever do not deteriorate transparency, birefringence, thermostability, and low absorbency can be used. For example, an acrylic ester, such as methyl acrylate, ethyl acrylate, propyl acrylate, n-butyl acrylate, isobutyl acrylate, tert-butyl acrylate, pentyl acrylate, n-hexyl acrylate, 2-ethylhexyl acrylate, n-octyl acrylate, dodecyl acrylate, octadecyl acrylate, butoxyethyl acrylate, phenyl acrylate, benzyl acrylate, naphthyl acrylate, glicidyl acrylate, 2-hydroxyethyl acrylate, a methacrylic ester, such as ethyl methacrylate, propyl methacrylate, n-butyl methacrylate, isobutyl methacrylate, tert-butyl methacrylate, pentyl methacrylate, n-hexyl methacrylate, 2-ethylhexyl methacrylate, n-octyl methacrylate, dodecyl methacrylate, octadecyl methacrylate, butoxyethyl methacrylate, phenyl methacrylate, naphthyl methacrylate, glicidyl methacrylate, 2-hydroxyethyl methacrylate, an aromatic vinyl compound, such as α-methyl styrene, α-ethyl styrene, α-fluoro styrene, α-chloro styrene, α-bromo styrene, fluoro styrene, chloro styrene, bromo styrene, methyl styrene, methoxy styrene, a (meth)acrylamide compound, such as acrylamide, methacrylamide, N-dimethyl acrylamide, N-diethyl acrylamide, N-dimethyl methacrylamide, N-diethyl methacrylamide, a metal (meth)acrylate compound, such as calcium acrylate, barium acrylate, lead acrylate, tin alcrylate, zinc acrylate, calcium methacrylate, barium methacrylate, lead methacrylate, tin methacrylate, zinc methacrylate and the like, an unsaturated fatty acid, such as acrylic acid, methacrylic acid and the like, a cyano vinyl compound, such as acrylonitrile, methacrylonitrile and the like, and the like can be available. As well, these compounds are used solely or used together.

(2) The Ingredient Ratio

The ingredient ratio of "Monomer Ingredient (E) based on the sum total of the monomer mixtures ((A)+(B)+(C)+(D)+(E))" is preferably 0 to 10 wt %, and more preferably 0 to 5 wt %. Where the ratio of Monomer Ingredient (E) more than 10 wt %, thermostability becomes low and birefringence becomes deteriorate.

6. Copolymerization of the Monomer Mixture (1) Copolymerizing Method

① Polymerizing Method

As a method of polymerizing the monomer mixture for preparing the non-birefringent optical resin, conventional methods, such as a bulk polymerization method, a suspension polymerization method, an emulsion polymerization method, a solution polymerization method and the like, can be used. In order to use the obtained resin for the optical elements, the bulk polymerization method is preferable in view of impurity mixing into the resin and the suspension polymerization method is preferable in view of handling of the products.

② Polymerization Initiator

When copolymerizing, a polymerization initiator can be used. As the polymerization initiator, a polymerization initiator whichever can be used for common radical polymerization process can be used. For example, an organic peroxide, such as benzoyl peroxide, lauroyl peroxide, di-tert-butylperoxyhexahydroterephthalate, tert-butylperoxy-2-ethylhexanonate, 1,1-tert-butylperoxy-3,3,5-trimethylcyclohexane and the like, an azo compound, such as azobisisobutyronitrile, azobis-4-methoxy-2,4-dimethylvaleronitrile, azobiscyclohexanone-1-carbonitrile, azodibenzoyl and the like, an water soluble catalyst, such as potassium persulfate, ammonium persulfate and the like, a redox catalyst combined of a peroxide or persulfate and a reducing agent can be available. It is preferred that the polymerization initiator is used at the range of 0.01 to 10 wt % of the monomer mixtures.

③ Molecular Weight Adjusting Agent (Chain Transfer Agent)

When copolymerizing, in addition a molecular weight adjusting agent, such as a mercaptan compound, thioglycohol, tetrachloromethane, α-methylstyrene dimer and the like, can be used as the need arises.

④ Polymerization Temperature

In case of the thermal polymerization, as the polymerization temperature of 0 to 200° C. can be selected and the polymerization temperature of 50 to 120° C. is preferred.

⑤ Suspension Polymerization

Suspension polymerization is done in an aqueous medium with a suspending agent and a suspending assistant agent as the need arises. As the suspending agent, a water-soluble polymer, such as polyvinyl alcohol, methyl cellulose, polyacrylamide etc., a poor soluble inorganic substance, such as calcium phosphate, magnesium pyrophosphorate etc., and the like can be used. It is preferred that the water-soluble polymer is used at the ratio of 0.03 to 1 wt % of the total monomer mixture, and it is preferred that the poor soluble inorganic substance is used at the ratio of 0.05 to 0.5 wt % of the total monomer mixture.

As the suspending assistance agent, an anion surface-active agent, such as sodium dodecylbenzene sulfonate and the like, can be used. In case of using the poor soluble inorganic substance as the suspending agent, it is preferred that the suspending assistance agent is used. It is preferred that the suspending assistance agent is used at the ratio of 0.001 to 0.02 wt % of the total monomer mixture.

(2) Determination of the Mixture Ratio of the Monomer Ingredients

According to the present invention, a monomer mixture is copolymerized at such a ratio as to give the resin having an absolute value of orientational birefringence of less than $1 \times 10^{-6}$.

The determination of the mixture rate of the monomer ingredients is done by the following method. First, about 50 µm film is formed from the resin obtained from the suspension polymerization with various mixture ratio, and the film is doubled by drawing elongation (elongation temperature: 90° C.). Then the mixture ratio which give the resin having an absolute value of birefringence of less than $1 \times 10^{-6}$ is searched.

That is to say, the mixture rate of the monomer ingredients is determined by first copolymerizing the monomer mixture at the ratio of each monomer ingredients (A) to (E), and second selecting the combination which gives the resin having the predetermined absolute value of orientational birefringence.

II. Non-Birefringent Optical Resin

As the non-birefringent optical resin obtained by the above method, molecular weight is not restricted. However, it is preferred that the weight average molecular weight (in polystyrene) is 10,000 to 1,000,000, and it is more preferred that the weight average molecular weight is 100,000 to 300,000 in view of thermostability and moldability.

As well, with regard to the non-birefringence optical resin, it is preferred that the absolute value of the birefringence (by the phase differential measurement per thickness (mm)) of Point A in the vicinity of the gate of the molded article as shown in FIG. 1 is less than $2 \times 10^{-6}$, and that glass transition temperature is 110° C. or more, and that saturated water absorbency is equal to or less than 1.8 wt %.

With regard to the non-birefringent optical resin, for the optical elements use, in view of prevention of deterioration, thermostability, moldability, processability, etc., an antioxidant, such as phenolic, phosphitic, thioeteric, etc. antioxidant, a mold lubricant, such as an aliphatic alcohol, a fatty ester, a phthalic ester, triglycerides, a fluorine surfactant, a metal salt of higher fatty acid, etc., a lubricant, a flexibilizer, an anti-static agent, an ultraviolet absorbers, a flame retardant, a heavy metal deactivator and the like can be added.

III. Optical Element

The optical element according to the present invention is made by using the birefringent optical resin prepared by the above process. As the method of forming the optical element from the resin, publicly known the molding method, such as the injection molding method, the compression molding method, the micro molding method, the floating molding method, the Rolinx process, the casting method, etc., can be utilized. In case of the casting method, a method which comprises the steps of first polymerizing partially, then second injecting the monomer mixture, and then finally polymerizing completely, whereby the optical element as a molded article and the non-birefringent optical resin are formed simultaneously, can be used.

As well, onto the surface of the molded article prepared by the above method, an inorganic compound, such as $MgF_2$, $SiO_2$, etc., can be coated by the vacuum evaporation, the sputtering, the ionplating, etc. As well, onto the surface of the molded article, an organic silicon compound, such as a silane coupling agent, a vinyl monomer, a melanin resin, an epoxy resin, a fluorine resin, a silicone resin, etc., can be coated by hard-coating method and the like. By the hard-coating method the moisture proof characteristics, the optical characteristic, the chemical proof characteristic, the wear resistance characteristic, the anti-fog characteristics and the like are improved.

As the optical element according to the present invention, for example, a lens, such as a general camera lens, a video camera lens, an objective lens for laser pickup, a lens of a diffraction grating or a hologram, a collimator lens, a fθ lens for laser printer, a cylindrical lens, a condenser lens or a projection lens for the LC projector, a Fresnel lens, a lens for glasses, etc., a disk substrate, for a compact disk (CD, CD-ROM), a minidisk (MD), a DVD, a component for a liquid crystal device, such as a substrate for LCD, a transparent sheet for a polarized film, a phase difference film, a light diffusion film, an adhesive for connecting the LC device, a screen for the projector, an optical filter, an optical fiber, an optical waveguide, a prism and the like can be enumerated.

As the above mentioned, the non-birefringent optical resin according to the present invention is suitable for the optical element, especially the component for the liquid crystal device. For example, for a substrate for LCD, which is disposed between liquid crystal layer and the polarizer. Constructing the substrate by the non-birefringent optical resin according to the present invention makes it possible to improve various properties owing to its superior optical resin material mentioned above.

As well, a polarizing plate for liquid crystal device is formed by putting a polarizer together with transparency resin sheets in both faces. It is effective to use the non-birefringent optical resin prepared by the present invention as the transparency resin sheet. The usage improves various properties as well as the above.

In addition, it is also effective to use the non-birefringent optical resin prepared by the present invention as the adhesive for uniting each liquid crystal element in view of its superior non-birefringence. Namely, since there was not superior resin material for adhesive for the liquid crystal device, the conventional liquid crystal device adopted a tackiness agent in order to adher each element (except for the case, such as a monochromic type device, where a superior non-birefringence is not required). However, using the non-birefringent optical resin prepare by the present invention as the adhesive makes it possible to provide a superior liquid crystal in durability and thermostability.

[Embodiment]

The present invention will be described in the following embodiments, but the embodiments do not restrict the scope of the present invention.

Water-Soluble Polymer (a) (a polymethacrylate salt) used as the suspending agent is synthesized according to the following process.

(Synthesis of Water-Soluble Polymer (a))

5 g of methyl methacrylate, 12 g of 2-hydroxyethyl methacrylate, 23 g of potassium methacrylate, and 360 g of deionized water are poured into a separable flask of 500 ml capacity. Then air is removed from the system by blowing N2 gas into the flask. After that the system is heated up to 65° C. in a water bath with stirring and then 0.06 g of potassium persulfate is added. Next, polymerization is carried out in the same temperature for 5 Hrs. In consequence, the system is heated up to 90° C. and the stirring is continued for 2 hrs to obtaine the jelled Water-Soluble Polymer (a).

[Embodiment 1]

100 g of tricyclo[$5.2.1.0^{2.6}$]deca-8-yl methacrylate, 1500 g of methyl methacrylate, 400 g of N-cyclohexylmaleimide, 8 g of lauroyl peroxide, and 4 g of n-octylmercaptan are solved and a monomer mixture is obtained.

Into a separable flask of 5l capacity provided with a stirrer and a condenser, 0.1 g of the above gelled Water-Soluble Polymer (a) and 2500 g of deionized water are added. Then a buffer solution of disodium hydrogen phosphate and sodium dihydrogen phosphate is added, stirred and adjusted at pH7.2 and a suspension medium is obtained. Into this, the above monomer mixture is added and polymerized under the condition of 240 rpm, at 60° C. for 3 hrs under nitrogen atmosphere, and polymerized at 98° C. for 2 hrs and resin particles are obtained (polymerization rate is 99% measured by the weight method). After washing the particles with water, dehydration, and drying, molding process is carried out by using the injection molding machine IS-50EP (manufactured by Toshiba-Kikai Co., Ltd) under the condition of cylinder temperature of 260° C., ejection speed of 50 cm$^3$/sec, and die temperature of 90° C. Then, the test pieces for evaluate the characteristic as shown in FIG. 1 (50×40×3 (mm) and (20×15×5 (mm)) are obtained. Point A is positioned at 5 mm below from the lower end of the gate 20, which projects from the upper end of FIG. 1.

[Embodiments 2 to 5, Comparison Embodiments 1 to 7]

Using the monomer mixture as shown in Table 1, test pieces for evaluation of characteristics are formed as same as Embodiment 1.

With regard to the resin particles and the test pieces obtained in Embodiments 1 to 5 and Comparison Embodiments 1 to 7, orientational birefringence, birefringence of the molded articles, saturated water absorbency and glass transition temperature (hereinafter "Tg") are measured and the signal-reading test is carried out. The result is shown in Table 1. As well, with regard to the test pieces obtained in Embodiment 1 to 5 and Comparison Embodiment 1, 3 and 4, the screen-projection test is carried out. The result is shown in Table 2. The measurements and the tests are carried out as follows.

(1) Orientational Birefringence 1 g of each of the resin particles obtained by the suspension polymerization is dissolved in 6 g of tetrahydrofuran, and coated on a glass substrate and then the surface of which is uniforamaly smoothed by a knife-coater. After drying the film, the film is removed from the glass substrate, and a film of about 50 $\mu$m is formed. Next, the film is elongated twice (drawing temperature: 90° C.), orientational birefringence is measured.

(2) Birefringence of the Molded Articles

With regard to the test piece of 50×40×3 (mm), by using a He—Ne laser ellipsometer AEP-100 (manufactured by Shimadzu co., Ltd.), phase difference characteristics at Point A of FIG. 1 are measured and characteristics of birefringence per 1 mm thickness are calculated.

$$\text{Birefringence per thickness} = \frac{\text{Phase differences (nm)}}{3 \times 10^{-3}} \quad (1)$$

(3) Saturated Water Absorbency

After drying the test pieces of 20×15×5 (mm) and measuring the weight, let the test pieces in water of 70° C. and absorb water at saturated level. Then the weights are measured and characteristics of the saturated water absorbency (SWA) are calculated based on the Weight after absorbing water (WAA) and the Weight before absorbing water (WBA) as follows.

$$SWA(\text{wt \%}) = (WAA - WBA) \times 100 / WBA \quad (2)$$

(4) Glass Transition Temperature (Tg)

With regard to the obtained resin particles, glass transition temperatures (Tg) are measured by using a differential scanning calorimeter DSC7 (manufactured by Perkin-Elmer Co.).

(5) Signal-Reading Test

Figure 2:
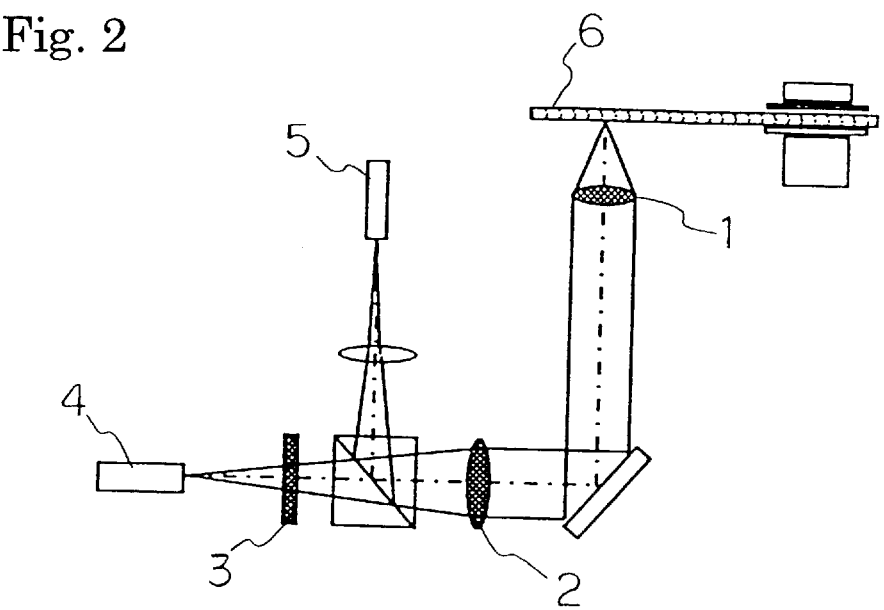
FIG. 2 shows the explanatory view of the signal reading test used in the embodiments of the present invention.

As shown in FIG. 2, the objective lens 1 for the signal-reading test, the collimater lens 2 and the diffraction grating 3 are mounted on MD player under the condition of 40° C. and 90%RH, the test whether a signal of MD for signal evaluation test can be read or not is carried out. The evaluation criteria are described as follows. A laser is described number 4, a light receiving device is described number 5, and a disk substrate is described number 6 respectively.

◯: readable

×: there are read errors (6) Screen-Projection Test

Figure 3:
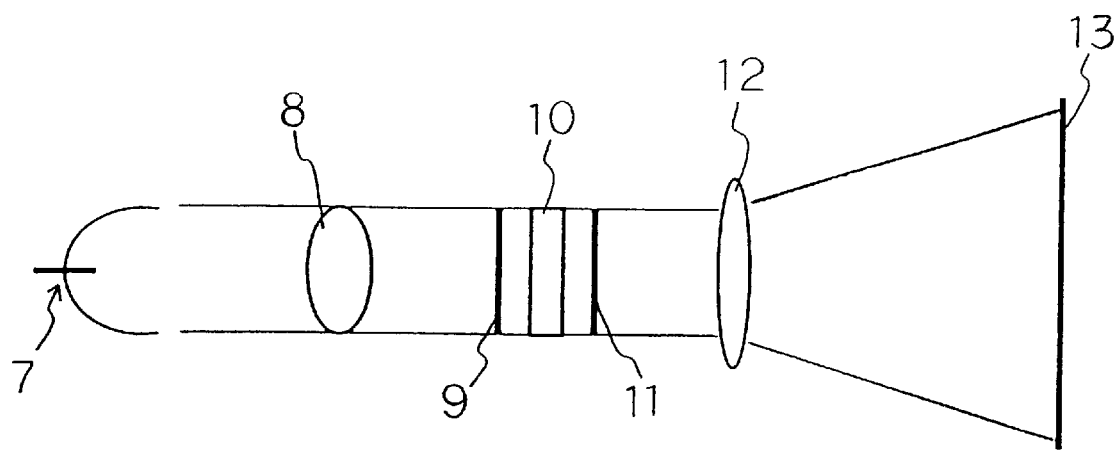
FIG. 3 shows the explanatory view of the screen-projection test used in the embodiment of the present invention.

As shown in FIG. 3, the molded condenser lens 8 and the projection lens 12 are mounted on the optical unit for the screen-projection test having the metal halide lamp 7/ the condenser lens 8/ the incident polarizing plate for incident side 9/ the liquid crystal panel 10/ the polarizing plate of outgoing side 11/ the projection lens 12/ the screen 13 positioned in order. Lightening the metal halide lamp 7, and then eyesight evaluation is carried out regarding the enlarged image of the liquid crystal panel 10 projected on the screen 13.

The evaluation criteria are described as follows.

◯: contrast is good and there is no image distortion

×: contrast is uneven

××: there is a image distortion by condenser lens deformation

In the following figures, MMA denotes methyl methacrylate, TCDMA denotes tricyclo[5.2.1.0$^{2.6}$]deca-8-yl methacrylate, CHMI denotes N-cyclohexyl maleimide, and BZMA denotes benzyl methacrylate.

TABLE 1

| | Monomer ingredients | | | | Orientational birefringence ×10$^{-5}$ (−) | Birefringence ×10$^{-6}$ (−) | Saturated water absorbency (%) | Tg (° C.) | Signal reading test |
|---|---|---|---|---|---|---|---|---|---|
| | MMA | TCDMA | CHMI | BZMA | | | | | |
| Embodiment 1 | 75 | 5 | 20 | — | <\|0.1\| | 0.7 | 1.7 | 127 | ◯ |
| Embodiment 2 | 60 | 15 | 25 | — | <\|0.1\| | −0.8 | 1.3 | 137 | ◯ |
| Embodiment 3 | 60 | 18 | 18 | 4 | <\|0.1\| | 1.4 | 1.2 | 128 | ◯ |
| Embodiment 4 | 66 | 12 | 10 | 12 | <\|0.1\| | 1.3 | 1.2 | 114 | ◯ |
| Embodiment 5 | 63 | 16 | 5 | 16 | <\|0.1\| | 0.7 | 1.2 | 110 | ◯ |
| Comparison Embodiment 1 | 100 | — | — | — | −52 | 16.7 | 2.2 | 108 | x |
| Comparison Embodiment 2 | 80 | — | 20 | — | <\|0.1\| | 1.8 | 113 | 125 | x |
| Comparison Embodiment 3 | 82 | — | — | 18 | <\|0.1\| | −1.3 | 1.8 | 90 | x |
| Comparison Embodiment 4 | 70 | 30 | — | — | −9.2 | 31.0 | 2.2 | 113 | x |
| Comparison Embodiment 5 | 63 | 27 | 10 | — | −4.8 | 19.3 | 1.2 | 123 | x |
| Comparison Embodiment 6 | 64 | 18 | 18 | — | −4.1 | 10.2 | 1.4 | 133 | x |
| Comparison Embodiment 7 | 67 | 28 | 5 | — | −6.9 | 1.8 | 1.2 | 117 | x |

◯: readable
x: there are read errors

TABLE 2

| | At the start time of using | After 500 hr using |
|---|---|---|
| Embodiment 1 | ◯ | ◯ |
| Embodiment 2 | ◯ | ◯ |
| Embodiment 3 | ◯ | ◯ |

TABLE 2-continued

|  | At the start time of using | After 500 hr using |
|---|---|---|
| Embodiment 4 | ○ | ○ |
| Embodiment 5 | ○ | ○ |
| Comparison Embodiment 1 | x | x |
| Comparison Embodiment 2 | ○ | xx |
| Comparison Embodiment 3 | x | x |

○: contrast is good and there is no image distortion
x: contrast is uneven
xx: there is a image distortion by condenser lens deformation

INDUSTRIAL APPLICABILITY

As mentioned above, the non-birefringent optical resin prepared by the present invention is superior in non-birefringence, thermostability, and low moisture absorbency, and the resin can be used effectively for various kinds of lenses, compact disks, components for liquid crystal device and the like.

What is claimed is:

1. A process for the preparation of a non-birefringent optical resin, which comprises copolymerizing a monomer mixture consisting of the monomers (A) to (E) at such a ratio as to give the resin an absolute value of orientational birefringence of less than $1\times10^{-6}$, the monomers being:

(A) 5 to 40 wt % of a methacrylic or acrylic ester having a $C_5$–$C_{22}$ aliphatic hydrocarbon group in the ester moiety;

(B) 50 to 80 wt % of methyl methacrylate;

(C) 5 to 40 wt % of an N-substituted maleimide;

(D) 4 to 20 wt % of benzyl methacrylate; and (E) 0 to 10 wt % of a monomer copolymerizable with said monomers.

2. The process for the preparation of a non-birefringent optical resin according to claim 1, wherein said (A) is selected from the group consisting of cyclohexyl methacrylate, isobornyl methacrylate, norbornyl methacrylate, norbornylmethyl methacrylate, tricyclo[$5.2.1.0^{2.6}$]deca-8-yl methacrylate and tricyclo[$5.2.1.0^{2.6}$]deca-4-methyl methacrylate.

3. The process for the preparation of a non-birefringent optical resin according to claim 1, wherein (C) is selected from the group consisting of N-methyl maleimide, N-ethyl maleimide, N-propyl maleimide, N-isopropyl maleimide, N-butyl maleimide, N-isobutyl maleimide, N-tert-butyl maleimide, N-cyclohexyl maleimide, N-lauryl maleimide and N-phenyl maleimide.

4. An optical element comprising a non-birefringent optical resin prepared by the process according to claim 1.

5. A process for the preparation of a non-birefringent optical resin, which comprises copolymerizing a monomer mixture consisting of the monomers (A) to (E) at such a ratio as to give the resin an absolute value of orientational birefringence of less than $1\times10^{-6}$, the monomers being:

(A) 5 to 40 wt % of tricyclo[$5.2.1.0^{2.6}$]deca-8-yl methacrylate;

(B) 50 to 80 wt % of methyl methacrylate;

(C) 5 to 40 wt % of an N-substituted maleimide;

(D) 0 to 30 wt % of benzyl methacrylate;

(E) 0 to 10 wt % of a monomer copolymerizable with said monomers.

6. An optical element comprising a non-birefringent optical resin prepared by the process according to claim 5.

* * * * *